United States Patent
Sternberg

(10) Patent No.: US 9,719,628 B2
(45) Date of Patent: Aug. 1, 2017

(54) MOUNTING SYSTEM FOR LABEL DISPENSING UNIT

(71) Applicant: Start Manufacturing, Inc., Addison, TX (US)

(72) Inventor: Todd Sternberg, Dallas, TX (US)

(73) Assignee: Start Manufacturing, Inc., Addison, TX (US)

( * ) Notice: Subject to any disclaimer, the term of this patent is extended or adjusted under 35 U.S.C. 154(b) by 0 days.

(21) Appl. No.: 13/661,970

(22) Filed: Oct. 26, 2012

(65) Prior Publication Data

US 2013/0175418 A1 Jul. 11, 2013

Related U.S. Application Data

(63) Continuation-in-part of application No. 13/345,172, filed on Jan. 6, 2012, now abandoned.

(51) Int. Cl.
*B65H 5/28* (2006.01)
*G07F 11/68* (2006.01)
*F16M 13/02* (2006.01)
*B65C 9/00* (2006.01)
*B65C 9/18* (2006.01)
(Continued)

(52) U.S. Cl.
CPC ............... *F16M 13/02* (2013.01); *B65C 9/00* (2013.01); *B65C 9/1869* (2013.01); *B65C 9/42* (2013.01); *B65H 75/28* (2013.01); *B65C 2009/0087* (2013.01)

(58) Field of Classification Search
CPC ...... A47G 29/00; A47G 29/02; A47G 29/087; A47G 29/093; A47G 2029/00; A47G 1/16; A47K 2201/02; F16M 13/02; B65C 9/00; B65C 9/1869

USPC .............. 221/73, 45, 283; 248/311.3, 214; 312/37; 211/105.3, 96
See application file for complete search history.

(56) References Cited

U.S. PATENT DOCUMENTS 2,518,328 A * 8/1950 Janonis ............... 242/597.5
2,743,023 A * 4/1956 Larson ................ 211/96
(Continued)

FOREIGN PATENT DOCUMENTS

DE 202005017265 U1 1/2006
JP 09314947 A 12/1997
(Continued)

OTHER PUBLICATIONS

Written Opinion issued Apr. 26, 2013 in corresponding application No. PCT/US2013/020274.
(Continued)

*Primary Examiner* — Rakesh Kumar
(74) *Attorney, Agent, or Firm* — Gardere Wynne Sewell LLP

(57) ABSTRACT

A mounting system for supporting equipment above a surface, such as, for example, a label dispensing unit, is provided. The system includes bracket having a first segment cantilevering from a housing and a second segment extending perpendicularly from the first segment and spaced apart from the housing. The housing and first and second segments form a channel to receive a support structure therein. The support structure is sized to fit within the channel to support the equipment above a surface when the bracket is disposed over the support structure.

4 Claims, 6 Drawing Sheets

(51) Int. Cl.
*B65C 9/42* (2006.01)
*B65H 75/28* (2006.01)

(56) References Cited

U.S. PATENT DOCUMENTS

| | | | |
|---|---|---|---|
| 2,798,230 A * | 7/1957 | Bailey et al. | 4/227.1 |
| D217,052 S | 3/1970 | Jones | |
| 3,589,338 A * | 6/1971 | Lovitz | 119/51.01 |
| 3,675,664 A * | 7/1972 | Kitowski | B60R 7/087 |
| | | | 248/311.2 |
| D230,264 S | 2/1974 | Howard | |
| 4,032,038 A * | 6/1977 | Hendricks | B65B 43/123 |
| | | | 221/71 |
| 4,389,934 A | 6/1983 | Holland-Letz | |
| 4,425,012 A * | 1/1984 | Kley | A47K 10/24 |
| | | | 211/105.3 |
| 4,497,420 A | 2/1985 | Stelcher et al. | |
| 4,543,095 A | 9/1985 | Jensen | |
| 4,986,524 A | 1/1991 | Meintzer, Jr. et al. | |
| 5,031,634 A * | 7/1991 | Simon | 600/567 |
| 5,056,945 A | 10/1991 | Klodt | |
| D336,493 S | 6/1993 | Brussing | |
| D340,942 S | 11/1993 | Smith | |
| 5,279,469 A | 1/1994 | Foit | |
| 5,301,634 A * | 4/1994 | Ho | A01K 39/012 |
| | | | 119/477 |
| 5,435,513 A * | 7/1995 | Davis | 248/311.3 |
| 5,445,703 A | 8/1995 | Steeves et al. | |
| 5,674,350 A * | 10/1997 | Jurgich | B65C 3/12 |
| | | | 156/540 |
| 5,791,586 A * | 8/1998 | Cayford | B05B 15/0456 |
| | | | 242/571.4 |
| 5,851,348 A | 12/1998 | Muenzer et al. | |
| 5,960,995 A * | 10/1999 | Leatherman | B67D 1/16 |
| | | | 137/313 |
| 6,029,849 A * | 2/2000 | Meshulam | B65H 37/005 |
| | | | 156/577 |
| 6,390,711 B1 | 5/2002 | Brunetti | |
| 6,805,262 B1 * | 10/2004 | Frazier | A47K 5/1214 |
| | | | 221/96 |
| 7,318,877 B2 | 1/2008 | Harte | |
| 7,350,553 B2 * | 4/2008 | Yu Chen | B29C 63/0013 |
| | | | 156/526 |
| 7,717,149 B2 | 5/2010 | Johnson | |
| D620,979 S | 8/2010 | Renner et al. | |
| 7,919,027 B2 | 4/2011 | Nordlinder et al. | |
| D643,158 S | 8/2011 | Lipscomb et al. | |
| 8,398,041 B2 * | 3/2013 | Brinkdopke | F16B 45/02 |
| | | | 248/316.1 |
| 2002/0117263 A1 | 8/2002 | McKenney et al. | |
| 2005/0199690 A1 * | 9/2005 | Peterson | B65D 5/0254 |
| | | | 229/122.1 |
| 2006/0096999 A1 * | 5/2006 | Horng | B65C 9/1865 |
| | | | 221/73 |
| 2006/0118567 A1 * | 6/2006 | Linnebur | A47K 10/421 |
| | | | 221/45 |
| 2006/0249240 A1 * | 11/2006 | Dijkstra | B65C 9/1884 |
| | | | 156/64 |
| 2007/0113986 A1 | 5/2007 | Harte | |
| 2008/0185353 A1 * | 8/2008 | Immerman et al. | 211/16 |
| 2011/0024585 A1 | 2/2011 | Brinkdopke et al. | 248/205.4 |
| 2012/0273434 A1 * | 11/2012 | Niederhuefner | A47F 1/128 |
| | | | 211/4 |
| 2013/0175289 A1 * | 7/2013 | Sternberg | B65C 9/1869 |
| | | | 221/70 |
| 2013/0175418 A1 * | 7/2013 | Sternberg | B65C 9/00 |
| | | | 248/301 |
| 2013/0240693 A1 * | 9/2013 | Jacobson | 248/205.8 |

FOREIGN PATENT DOCUMENTS

| | | |
|---|---|---|
| JP | 11-176463 A | 7/1999 |
| JP | 2005089035 A | 4/2005 |
| JP | 2010023964 A | 2/2010 |

OTHER PUBLICATIONS

International Search Report issued Apr. 26, 2013 in corresponding application No. PCT/US2013/020274.

* cited by examiner

MOUNTING SYSTEM FOR LABEL DISPENSING UNIT

CROSS REFERENCE TO RELATED APPLICATION

This application is a continuation-in-part of U.S. patent application Ser. No. 13/345,172, filed on Jan. 6, 2012, entitled Label Dispenser Unit, the disclosure of which is incorporated herein by reference in its entirety.

BACKGROUND

Labels with pressure-sensitive adhesive thereon are oftentimes attached to a strip of coated paper (i.e., a backing strip) and stored on a roll. In order to easily remove the labels from the backing strip, automated and semi-automated label dispensers and applicators have been devised. One common type of arrangement releases labels from a label roll by passing the backing strip over a bar or plate and turning or otherwise wrapping the backing strip in an abrupt turn beneath the bar or plate. This turn causes the leading edge portion of the label to separate from the backing strip since the labels are formed of a material that tends to resist the bending necessary to negotiate the turn. However, many existing systems require numerous parts and thus, become increasingly expensive to manufacture. Furthermore, other systems lack effective mechanisms for applying tension to the backing strip as it passes over the plate while separating the label from the backing strip. In addition, existing systems are unable to be supported above a working surface to provide a larger working area for a user.

DETAILED DESCRIPTION

Figure 1:
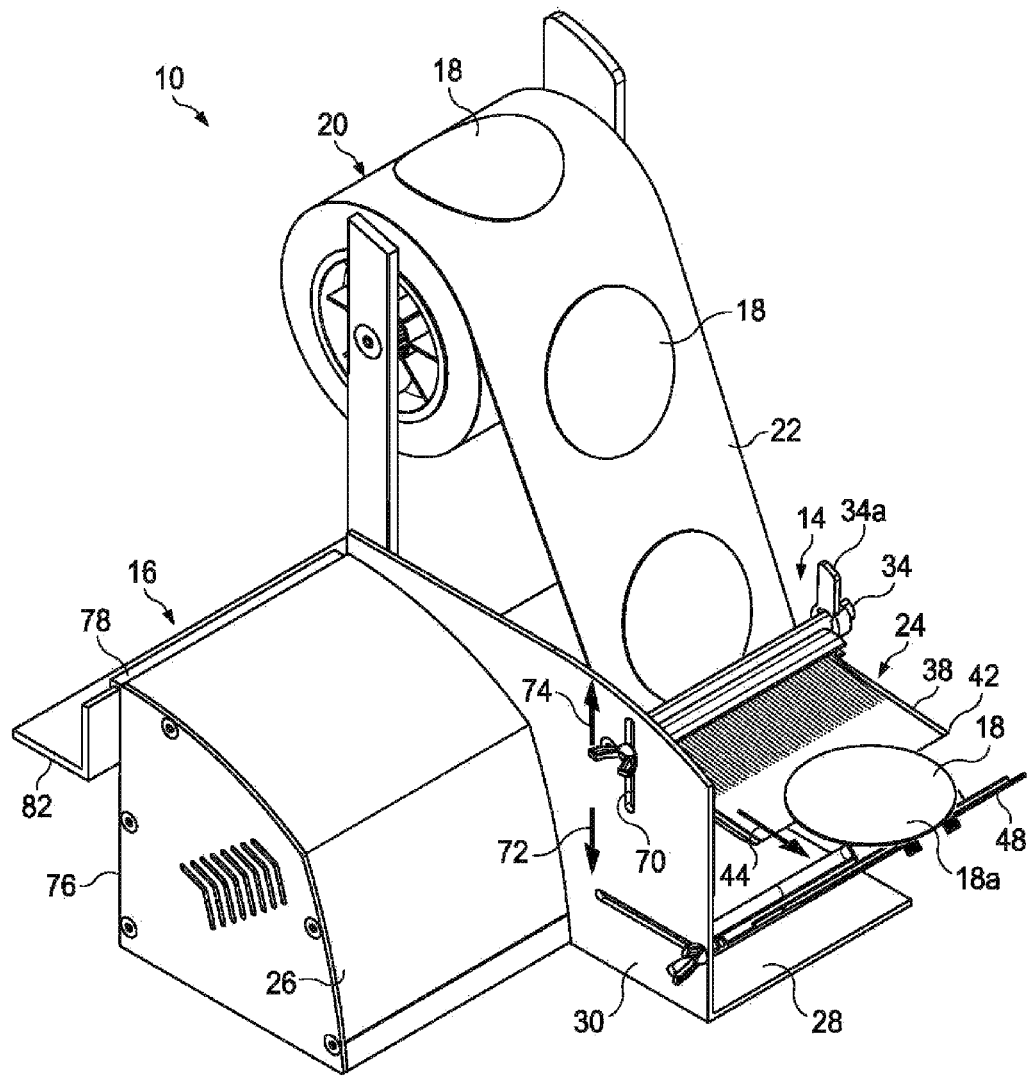
FIG. 1 is a front perspective view of an improved label dispenser assembly.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 2:
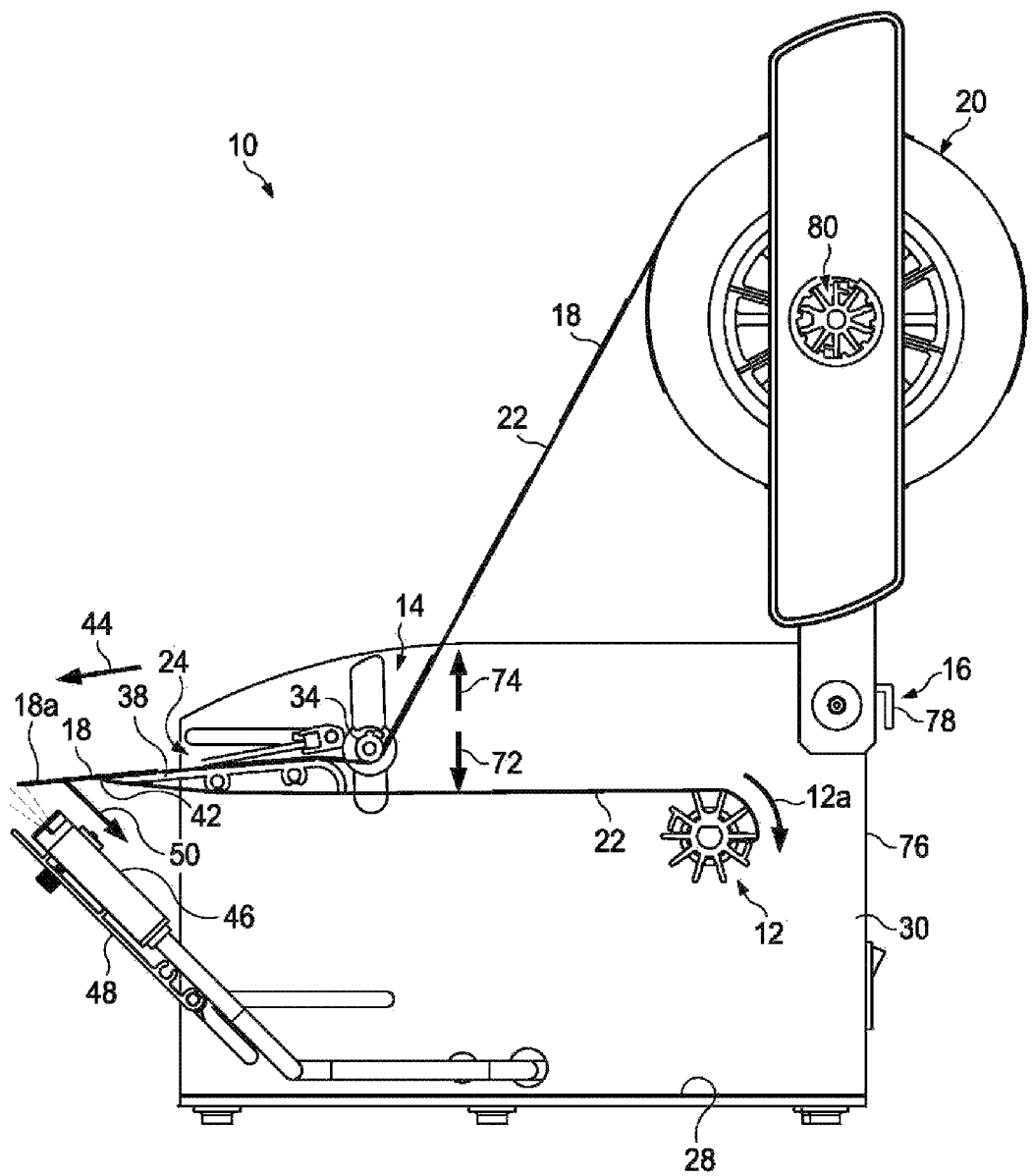
FIG. 2 is a side view of the label dispenser assembly of FIG. 1.

FIGS. 1 and 2 illustrate a label dispenser unit 10 in which an improved take-up hub 12, tensioning system 14 and mounting system 16 are employed to advantage. In operation, label dispenser unit 10 dispenses adhesive labels 18 disposed on a label roll 20 by automatically peeling a leading edge portion 18a of label 18 from a backing strip 22 as the backing strip 22 is pulled through a label releasing station 24. After label 18 is removed from backing strip 22, backing strip 22 is pulled toward and rolled onto take-up hub 12, which is rotated by an electric motor (not illustrated) disposed within a motor housing 26 (FIG. 2).

As illustrated in FIGS. 1 and 2, dispenser unit 10 includes a horizontal support section 28 for supporting dispenser unit 10 on a support surface, and a generally upright or vertical support section 30 extending perpendicularly from horizontal section 28 for supporting various components of dispenser unit 10. For example, motor housing 26 is removably secured to vertical support section 30 and is sized to store the electric motor and other operational components used in the control and operation of dispenser unit 10.

Referring specifically to FIG. 2, backing strip 22 extends from roll 20 beneath a tensioning/guide rod 34 and through label releasing station 24. As backing strip 22 passes through label releasing station 24, backing strip 22 turns in the opposite direction toward and onto take-up hub 12, where the used portion of backing strip 22 (i.e., portions having label 18 removed therefrom) are rolled onto and stored thereon. In operation, as the motor is actuated, take-up hub 12 rotates in the direction of arrow 12a thereby providing a pulling force on backing strip 22 to pull backing strip 22 through label releasing station 24. As backing strip is pulled, leading portion 18a separates from backing strip 22. It should be understood, however, that the motor is operable in the reverse direction in order to rotate take-up hub 12 in the opposite direction of arrow 12a to provide a pulling force on backing strip 22.

In the embodiment illustrated in FIG. 2, label releasing station 24 comprises a plate 38 having a planar surface to enable backing strip 22 to slide therealong and bend or otherwise abruptly turn around an edge 42. As backing strip turns around edge 42, leading portion 18a separates from backing strip 22 since labels 18 are of a sufficient stiffness to resist the bending necessary to negotiate the abrupt turn around edge 42. After separation, leading edge portion 18a continues forward in the direction of arrow 44 until at least a portion of label 18 is detected by a sensor/detector 46 (best illustrated in FIG. 2). In the embodiment illustrated in FIGS. 1 and 2, sensor 46 comprises an optical sensor mounted on a support plate 48, the sensor 46 being operable to detect leading portion 18a as it travels through a beam path generated by sensor 46. After detection, a signal is generated to stop further rotation of take-up hub 12, and thus, movement of backing strip 22 until label 18 is removed so that it no longer blocks the beam path. Once removed, a signal is generated to enable the motor to rotate take-up hub 12 to pull the next adjacently positioned label through label releasing station 24 until another label 18 is positioned across the beam path generated by sensor 46. While FIGS. 1 and 2 illustrate an optical sensor, it should be understood that any type of sensor device, detector or other method can be used to detect leading edge portion 18a and thus stop rotation of take-up hub 12.

Figure 3:
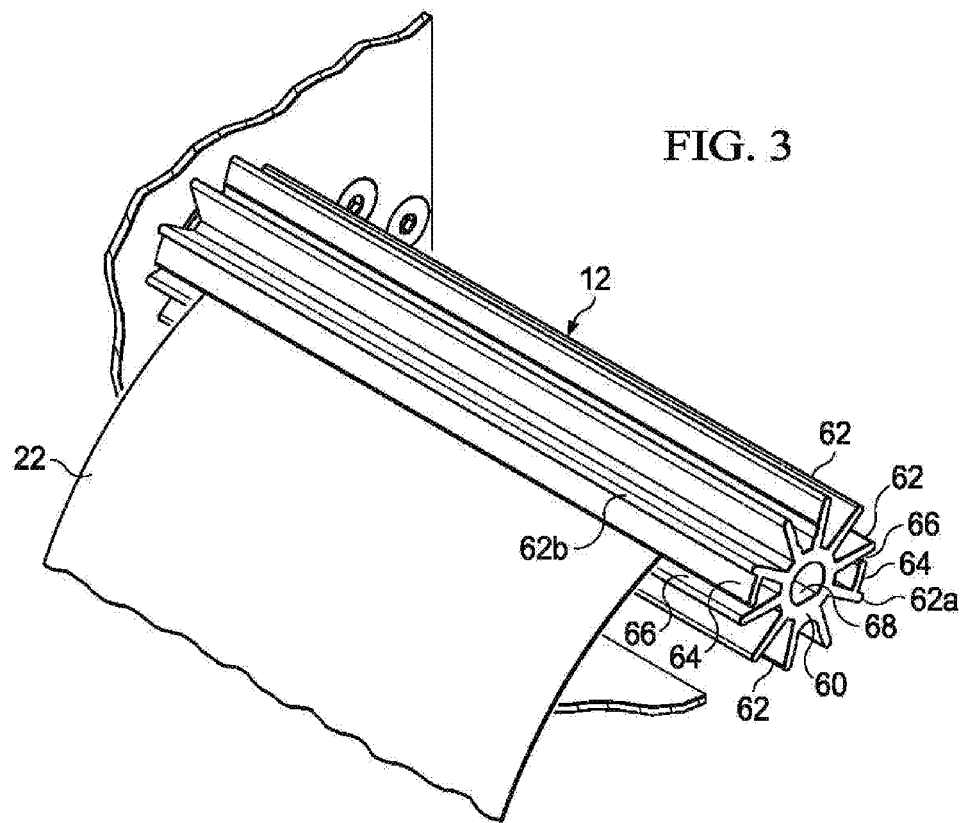
FIG. 3 is a perspective view of an improved take-up hub illustrated in FIGS. 1 and 2.
Figure 4:
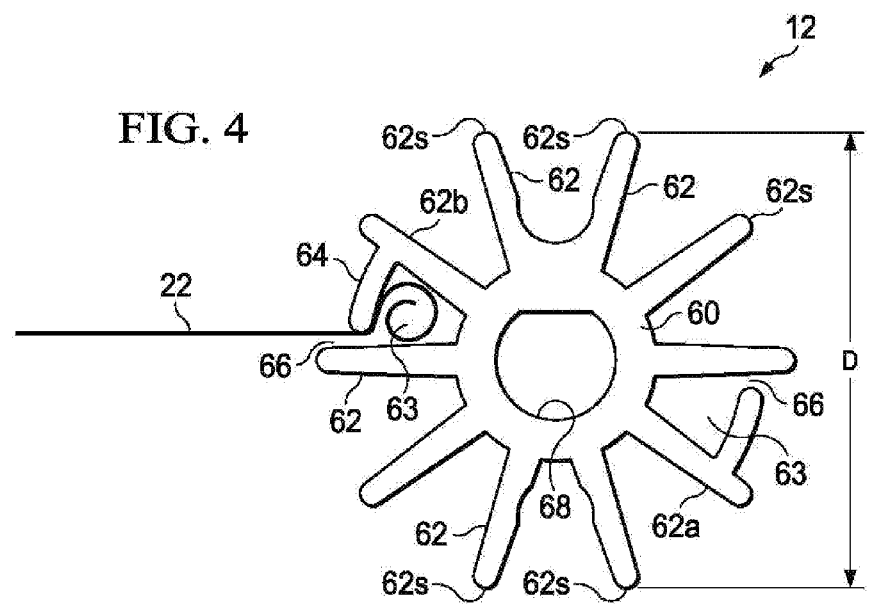
FIG. 4 is a side view of the take-up hub illustrated in FIG. 3.

Referring now to FIGS. 3 and 4, take-up hub 12 is formed of a central hub portion 60 having spaced apart spokes 62 radially extending therefrom. At least one spoke 62 comprises a cantilevered portion 64 extending therefrom toward a second and adjacently positioned spoke member 62. According to the embodiment illustrated in FIGS. 3 and 4, the end of cantilevered portion 64 is spaced apart from spoke member 62 forming a gap 66 to facilitate access to a chamber 63, which is formed by two adjacently positioned spoke members 62 and cantilevered portion 64 extending therebetween. Chamber 63 and sized to receive an end of backing strip 22. In the embodiment illustrated in FIGS. 3 and 4, two spokes 62a and 62b contain cantilevered portions 64; however, it should be understood that a greater or fewer number of spokes 62 can comprise cantilevered portions 64. Embodiments of take-up hub 12 disclosed herein provide a quick and easy method of attaching the backing strip 22 to take-up hub 12 without the use of tools or requiring any additional components to secure backing strip 22 to take-up hub 12.

During initial setup, for example, label roll 20 is secured onto dispenser unit 10. Once secured, the exposed end of backing strip 22 is fed underneath guide rod 34 and pulled around plate 38 until the end is aligned with and otherwise inserted through gap 66 and into chamber 63. Take-up hub can then be rotated in the direction of arrow 12*a* (FIG. 2) so that backing strip 22 self-locks and wraps around take-up hub 12. Once backing strip 22 is locked onto take-up hub 12, rotation of take-up hub 12 generates the pulling force, as described above, to cause labels 18 to be separated from backing strip 12 when passing through label releasing station 24.

Preferably, each spoke 62 extends a length from central hub portion 60 such that the ends of each spoke 62 form a generally circular support surface 62*s* (FIG. 4) for supporting backing strip 22 at periodic intervals when backing strip 22 is wrapped around take-up hub 12 (FIG. 1). As seen in FIGS. 3 and 4, take-up hub 12 includes an opening 68 shaped for receiving a correspondingly shaped motor driven shaft (not illustrated) thereby preventing relative movement between take-up hub 12 and the motor shaft. In FIGS. 3 and 4, opening 68 is generally "D" shaped to correspond to a similarly shaped motor driven shaft; however, it should be understood that the shape of opening 68 can be any size or shape corresponding to correspond to a motor shaft. Accordingly, as the motor rotates take-up hub 12, the backing strip 22 is wound onto the take-up hub 12.

Preferably, take-up hub 12 is formed by an aluminum extrusion process; however, it should be understood that take-up hub 12 can be otherwise formed of any type of material using a variety of manufacturing methods. In addition, take-up hub 12 is configured to be optionally interchangeable to act as a dispensing reel 80 to enable roll 20 to be mounted on dispensing unit 10, as best illustrated in FIG. 2.

Referring back to FIGS. 1 and 2, guide rod 34 is adjustable to increase or decrease the tension applied to backing strip 22 as it wraps around plate 38. For example, if there is insufficient tension, label 18 may dispense at a lower dispensing angle and otherwise deflect downward in the direction of arrow 50 (FIG. 2), which may cause label 18 to contacting sensor 46 and/or otherwise avoiding detection by sensor 46 altogether. Accordingly, a slot 70 (FIG. 1) is formed on vertical support section 30 to enable guide rod 34 to be movable in the direction of arrows 72 and 74 to increase or decrease the tension on backing strip 22. For example, in the event increased tension of backing strip 22 is needed (i.e., in instances when label 18 deflects excessively downward in the direction of arrow 50), guide rod 34 is moved downward within slot 70 in the direction of arrow 72 to exert a downward force on backing strip 22 to reduce the amount of deflection of label 18. Likewise, in the event decreased tension is needed (i.e., to enable label 18 to be deflect in the direction of arrow 50), guide rod 34 is raised within slot 70 in the direction of arrow 74 thereby reducing the downward force on backing strip 22.

Figure 5A:
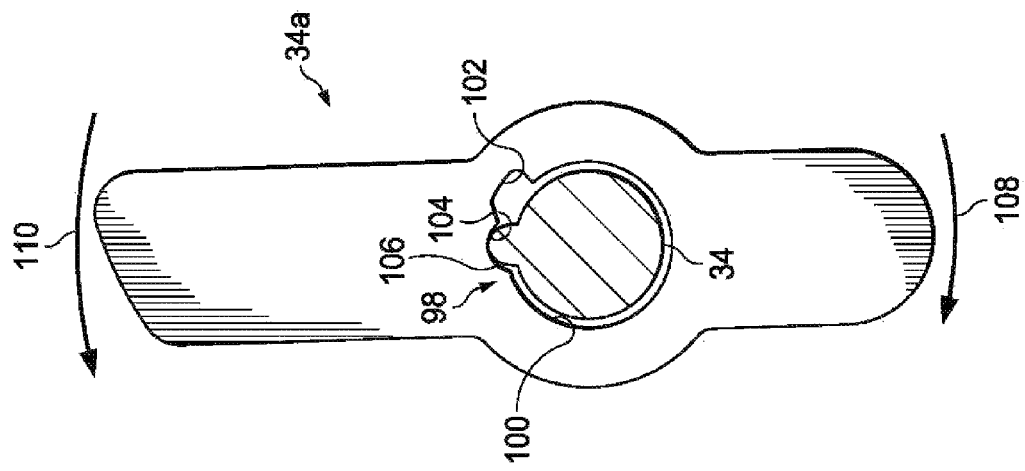
FIGS. 5A and 5B illustrations of a guide element disposed on a guide rod contained in the label dispense assembly of FIG. 1.
Figure 5B:
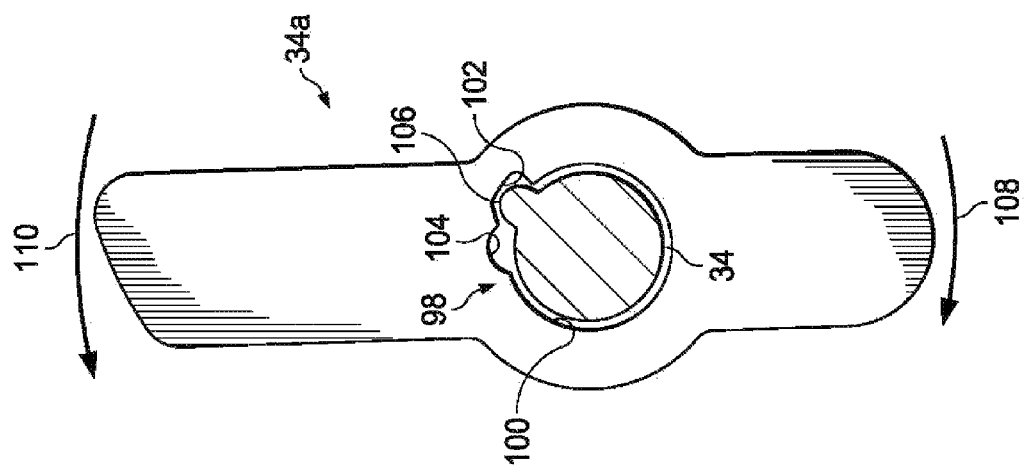

Referring now to FIGS. 1 and 5A-5B, guide element 34*a* is movably disposed on guide rod 34 so as to adjust for differing size widths of backing strip 22. For example, for backing strips 22 having smaller widths than the backing strip 22 illustrated in FIG. 1, guide element 34*a* can be repositioned on guide rod 34 closer to vertical support section 30. Likewise, for backing strips 22 having wider widths than the illustrated backing strip 22, guide element 34*a* can be repositioned on guide rod 34 at a position further way from vertical support section 30.

In the embodiment illustrated herein, a guide element 34*a* is frictionally locked onto guide rod 34 by a locking system 98 to prevent movement of guide element 34*a* relative to and along guide rod 34. Briefly, guide element 34*a* comprises a central opening 100 sized to correspondingly receive guide rod 34 therein. Central opening 100 comprises a first groove 102 and a second groove 104, the second groove 104 having a slightly shallower depth than the depth of groove 102. In the embodiments illustrated in FIGS. 5A and 5B, groove 102 is sized such that a protrusion 106, which extends from the outer surface of guide rod 34, fits therein with sufficient clearance from the inner surface of groove 102 to prevent frictional engagement between protrusion 106 and groove 102. Accordingly, when guide rod 34 is positioned such that protrusion 106 is disposed therein, guide element 34*a* is in an "unlocked" position to facilitate sliding movement along the length of guide rod 34. This enables guide element 34*a* to adjust to the width of differing sized backing strips 22. Once guide element 34*a* is properly positioned, guide element 34*a* is rotated in the direction of arrow 108 so that protrusion 106 is disposed within groove 104 (FIG. 5B) and in a "locked" position. As illustrated in FIGS. 5A and 5B, groove 104 is sized such that protrusion 106 frictionally engages the inner sidewall of groove 104, which acts to resist movement of guide element 34*a* relative to guide rod 34 to lock the position of guide element 34*a*. When it is desired to move or otherwise adjust the position of guide element 34*a* on guide rod 34, guide element 34*a* is rotated in the direction of arrow 110 such that protrusion 106 is repositioned back into groove 102, which allows for sliding movement of guide element 34*a* relative to guide rod 34.

Figure 6:
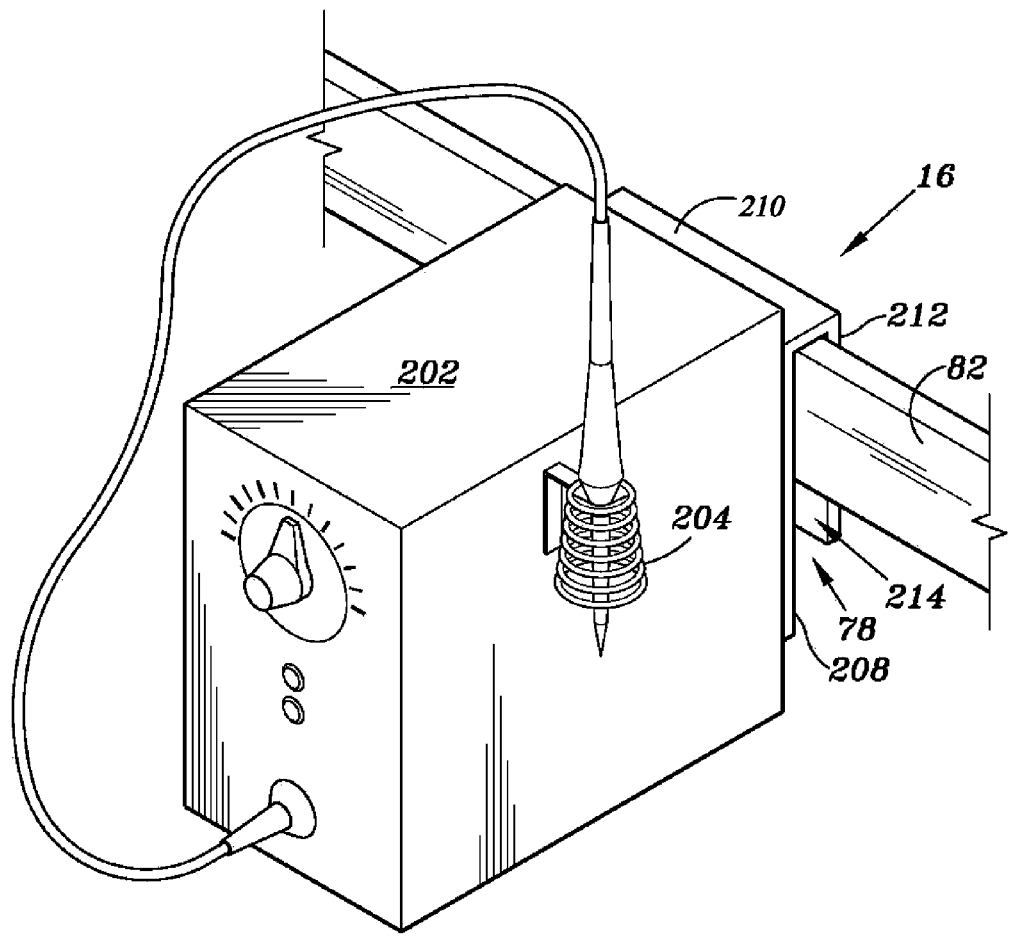
FIGS. 6-7 are illustrations of a mounting system for supporting equipment above a floor or working surface.
Figure 7:
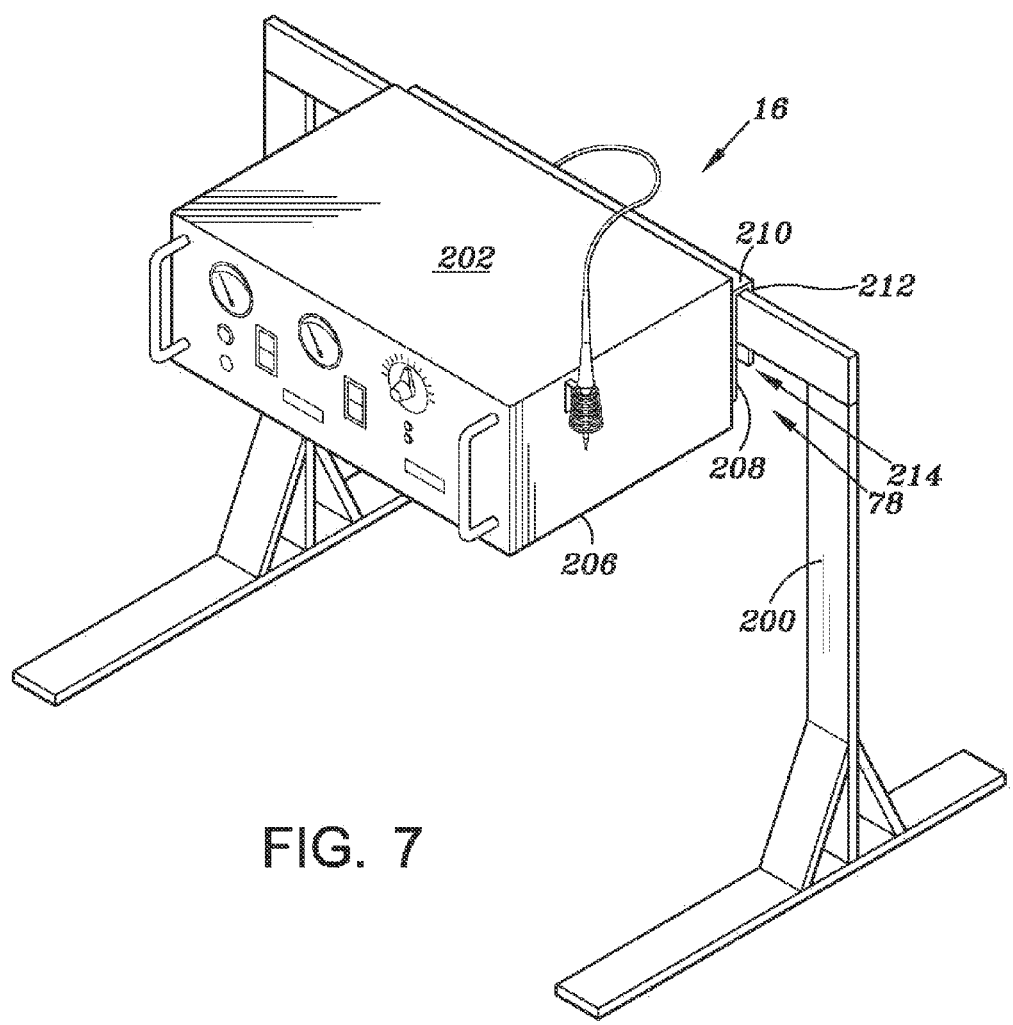

According to some embodiments, the mounting system 16 is employed to hang equipment from a support structure 82. For example, referring specifically to FIGS. 1 and 2, for example, mounting system 16 is disposed on rear wall 76 of motor housing 26. The mounting system 16 includes, for example, an "L" shaped bracket 78 for mounting to support 82, which can extend from or otherwise be secured to a wall, from a portion of a stand-alone support structure 200 (FIG. 7), be integrated with and supported by a work bench (not illustrated) or any other type of structure when it is desired to have the label dispensing unit 10 (or any other piece of equipment or object) supported above a work area, surface or floor to facilitate ease of access and use and to effectively utilize a working area. It should be understood that in addition to mounting system 16 being used in connection with label dispensing unit 10, the mounting system 16 can be used or otherwise incorporated with other types of equipment 202. For example, in addition to use with dispensing unit 10, other equipment 202 includes, but is not limited, to a soldering station 204 (FIG. 7), a de-soldering station 206 (FIG. 6), fume extractors, adhesive dispensers, electrical testing equipment, thermal transfer printers, tape dispensers, ionizer blowers and visual inspection systems. Referring specifically to FIG. 7 for example, mounting system 16 is coupled to and/or otherwise formed integral with the de-soldering station 206. The mounting mechanism 16 cantilevers from a sidewall 208 and is formed of a first segment 210 cantilevering from the sidewall 208 and a second segment 212 extending perpendicularly from first segment 210 and parallel with sidewall 208. As seen in FIGS. 6 and 7, segments 210 and 212 create "L" shaped bracket 78 and form a channel/slot 214 with sidewall 208 to receive the support structure 82. When the equipment 202 is disposed on the support structure 82, the bracket 78, and in particular channel 214, is aligned with the support structure 82, which is received within channel 214. Segments 210, 212 and sidewall 208 surround the support structure 82 to otherwise enable the equipment 202 to be supported thereon. It should be understood that while segment 210 extends and/or otherwise cantilevers from the top or end of sidewall 208, segment 210 is coupleable at any position along the sidewall 208. Furthermore, while the bracket 78 is illustrated to be integrally formed with equipment 202, it can be a separately attachable component attached by traditional fastening methods.

Although embodiments of label dispenser unit 10 and the mounting mechanism 16 have been described in detail, those skilled in the art will also recognize that various substitutions and modifications may be made without departing from the scope and spirit of the appended claims.

What is claimed is:

1. A label dispenser having a mounting system for securing to a support member for supporting the label dispenser above a surface, the label dispenser comprising:
   a horizontal support section for supporting the label dispenser on a surface and a vertical support section extending therefrom;
   a dispensing reel secured to the vertical support section, the dispensing reel for supporting a label roll having a plurality of labels attached to a backing strip;
   a label releasing station secured to the vertical support section, the label releasing station operable to separate the label from the backing strip;
   a take-up hub secured to the vertical support section for receiving the backing strip thereon after the labels have been separated from the backing strip;
   a motor disposed within a housing, the housing secured to the vertical support section and having a top wall, a bottom wall, a rear wall and a pair of sidewalls, the motor operable to rotate the take-up hub to move the backing strip through the label releasing station to separate the plurality of labels from the backing strip;
   a guide rod secured to and extending outwardly from the vertical support section to contact the backing strip, the guide rod slideably movable within an elongate slot formed in the vertical support section, the guide rod movable to adjust the tension of the backing strip, the guide rod having a guide element disposed thereon, the guide element formed having a central opening sized to correspondingly receive the guide rod therein, the central opening comprising a first groove and a second groove, the second groove having a shallower depth than the depth of the first groove, the second groove sized to frictionally engage a protrusion extending from the guide rod to resist relative movement between the guide rod and the guide element when the protrusion is disposed within the second groove; and
   the mounting system comprising a bracket disposed on the housing rear wall between the top wall and the bottom wall, the bracket extending along at least a portion of the rear wall and having a first segment cantilevering from the housing rear wall and a second segment extending perpendicularly from the first segment and spaced apart and parallel to the housing rear wall, the housing rear wall and first and second segments forming an open-ended channel to receive the support member therein, wherein when the support member is disposed in the open-ended channel, the first and second segments and the housing rear wall support the label dispenser in an upright position without any additional support structure to maintain the label dispenser in the upright position.

2. The label dispenser of claim 1, wherein at least a portion of the vertical support section is a sidewall for the housing.

3. The label dispenser of claim 1, wherein the slot is formed in the vertical support section between the take-up hub and the label releasing station.

4. The label dispenser of claim 3, wherein the slot extends vertically from a position above the label releasing station to a position below the label releasing station.

* * * * *